(12) United States Patent
Hefetz et al.

(10) Patent No.: US 7,495,225 B2
(45) Date of Patent: Feb. 24, 2009

(54) METHODS AND APPARATUS FOR PIXILATED DETECTOR MASKING

(75) Inventors: Yaron Hefetz, Herzeliya (IL); Joshua Liss, Yokneam Moshava (IL); Amir Pansky, Atlit (IL); Ira Blevis, Zichron Yaakov (IL)

(73) Assignee: General Electric Company, Schenectady, NY (US)

( * ) Notice: Subject to any disclaimer, the term of this patent is extended or adjusted under 35 U.S.C. 154(b) by 133 days.

(21) Appl. No.: 11/006,838

(22) Filed: Dec. 8, 2004

(65) Prior Publication Data

US 2006/0118730 A1 Jun. 8, 2006

(51) Int. Cl.
*G01T 1/24* (2006.01)

(52) U.S. Cl. .................................. 250/370.09

(58) Field of Classification Search ............. 250/370.09
See application file for complete search history.

(56) References Cited

U.S. PATENT DOCUMENTS

| | | | | |
|---|---|---|---|---|
| 4,118,632 A | * | 10/1978 | Luig | 250/363.1 |
| 5,757,006 A | * | 5/1998 | DeVito et al. | 250/366 |
| 6,091,070 A | | 7/2000 | Lingren et al. | |
| 6,188,089 B1 | * | 2/2001 | Spartiotis | 257/188 |
| 6,242,743 B1 | | 6/2001 | DeVito et al. | |
| 6,272,207 B1 | * | 8/2001 | Tang | 378/149 |
| 6,285,028 B1 | * | 9/2001 | Yamakawa | 250/370.09 |
| 2002/0141625 A1 | | 10/2002 | Nelson | |
| 2003/0111610 A1 | * | 6/2003 | Wagenaar et al. | 250/363.04 |
| 2004/0008810 A1 | | 1/2004 | Nelson et al. | |
| 2004/0052332 A1 | * | 3/2004 | Banchieri et al. | 378/147 |
| 2004/0218713 A1 | * | 11/2004 | Hoffman | 378/19 |
| 2005/0249331 A1 | * | 11/2005 | Wear et al. | 378/54 |

* cited by examiner

*Primary Examiner*—David P Porta
*Assistant Examiner*—Shun Lee
(74) *Attorney, Agent, or Firm*—The Small Patent Law Group; Dean D. Small

(57) ABSTRACT

A method of detecting ionizing radiation is provided. The method includes pixelating a semiconductor substrate such that each pixel comprises a central region and a region of variable response, substantially blocking the ionizing radiation from reaching the region of variable response, and receiving the ionizing radiation with the central region.

40 Claims, 4 Drawing Sheets

METHODS AND APPARATUS FOR PIXILATED DETECTOR MASKING

BACKGROUND OF THE INVENTION

This invention relates generally to imaging systems using pixilated detectors, and more particularly to pixilated semiconductor detectors in imaging systems.

Imaging devices, such as gamma cameras and computed tomography (CT) imaging systems, are used in the medical field to detect radioactive emission events emanating from a subject, such as a patient and to detect transmission x-rays attenuated by the subject, respectively. An output, typically in the form of an image that graphically illustrates the distribution of the sources of the emissions within the object and/or the distribution of attenuation of the object is formed from these detections. An imaging device may have one or more detectors that detect the number of emissions, for example, gamma rays in the range of 140 keV, and may have one or more detectors to detect x-rays that have passed through the object. Each of the detected emissions and x-rays is typically referred to as a "count," but may also be counted together as a 'signal current' and the detector determines the number of counts received at different spatial positions. The imager then uses the count tallies to determine the distribution of the gamma sources and x-ray attenuator, typically in the form of a graphical image having different colors or shadings that represent the processed count tallies.

A pixilated semiconductor detector, for example, a detector fabricated from cadmium zinc telluride (CZT), may provide an economical method of detecting the gamma rays and x-rays. However, a low energy tail on the energy spectrum resulting from the CZT interaction with the radiation may interfere with the ability to distinguish direct gamma rays and x-rays from scattered gamma rays and x-rays. The tail may result from a different response of the semiconductor material in the regions between the pixels compared to the response from within the pixels.

Another problem that may be associated with using a pixilated semiconductor detector is a loss of potential detector spatial resolution due to a gap between a detector collimator and the active detector surface. The gap is a result of known mounting technology that makes collimator exchange easier. The divergence of the gamma and x-ray photons in the gap may contribute to a degradation of a spatial resolution realizable from the detector. At least some known imaging devices use a variety of interchangeable collimators for respective different applications. Each collimator may differ in length and bore of the holes, and the weight of the collimators necessitates special handling equipment and procedures. This further increases the likelihood of a degradation of spatial resolution of the detector.

Furthermore, due to the fine tolerances needed to achieve accurate resolution of detector images, producing collimators having holes that are substantially aligned with each detector pixel is difficult, thus affecting image resolution.

BRIEF DESCRIPTION OF THE INVENTION

In one embodiment, a method of detecting ionizing radiation is provided. The method includes pixelating a semiconductor substrate such that each pixel comprises a central region and a region of variable response, substantially blocking the ionizing radiation from reaching the region of variable response, and receiving the ionizing radiation with the central region.

In another embodiment, an imaging system that includes a semiconductor detector is provided. The imaging system includes a pixilated semiconductor substrate that is responsive to ionizing radiation, the substrate including a first surface in a direction of a source of ionizing radiation, and a collimating mask covering the substrate surface, the collimating mask including a plurality of mask openings exposing a central region of a pixel of the semiconductor detector substrate to the ionizing radiation, the collimating mask including mask septa that facilitate substantially blocking the incident ionizing radiation from a region of variable response associated with the pixel.

In yet another embodiment, a collimating mask for a pixilated radiation detector is provided. The collimating mask includes a mask portion formed generally in a grid arrangement wherein the grid is configured to expose a central region of a pixel defined in a detector substrate of the detector, and to overlay a region surrounding the central region.

In still another embodiment, a detector assembly for an imaging system is provided. The detector assembly includes a radiation detector having a pixilated semiconductor substrate that includes a pixel electrode coupled to a first surface of the substrate wherein the pixel electrode defines a pixel region of the substrate, a cathode covering a second surface of the substrate, a dielectric layer covering the cathode, a collimating mask that includes a mask portion that has openings therethrough surrounded by a mask septa wherein the mask portion is configured to expose a central region of the pixel, and to overlay a region surrounding the central region. The detector assembly also includes a collimator removably couplable to the radiation detector wherein the collimator has apertures therethrough, and the apertures are configured to substantially align with the collimating mask openings. The collimator is further configured to receive another collimator such that apertures of each collimator substantially align with respect to each other.

DETAILED DESCRIPTION OF THE INVENTION

Figure 1:
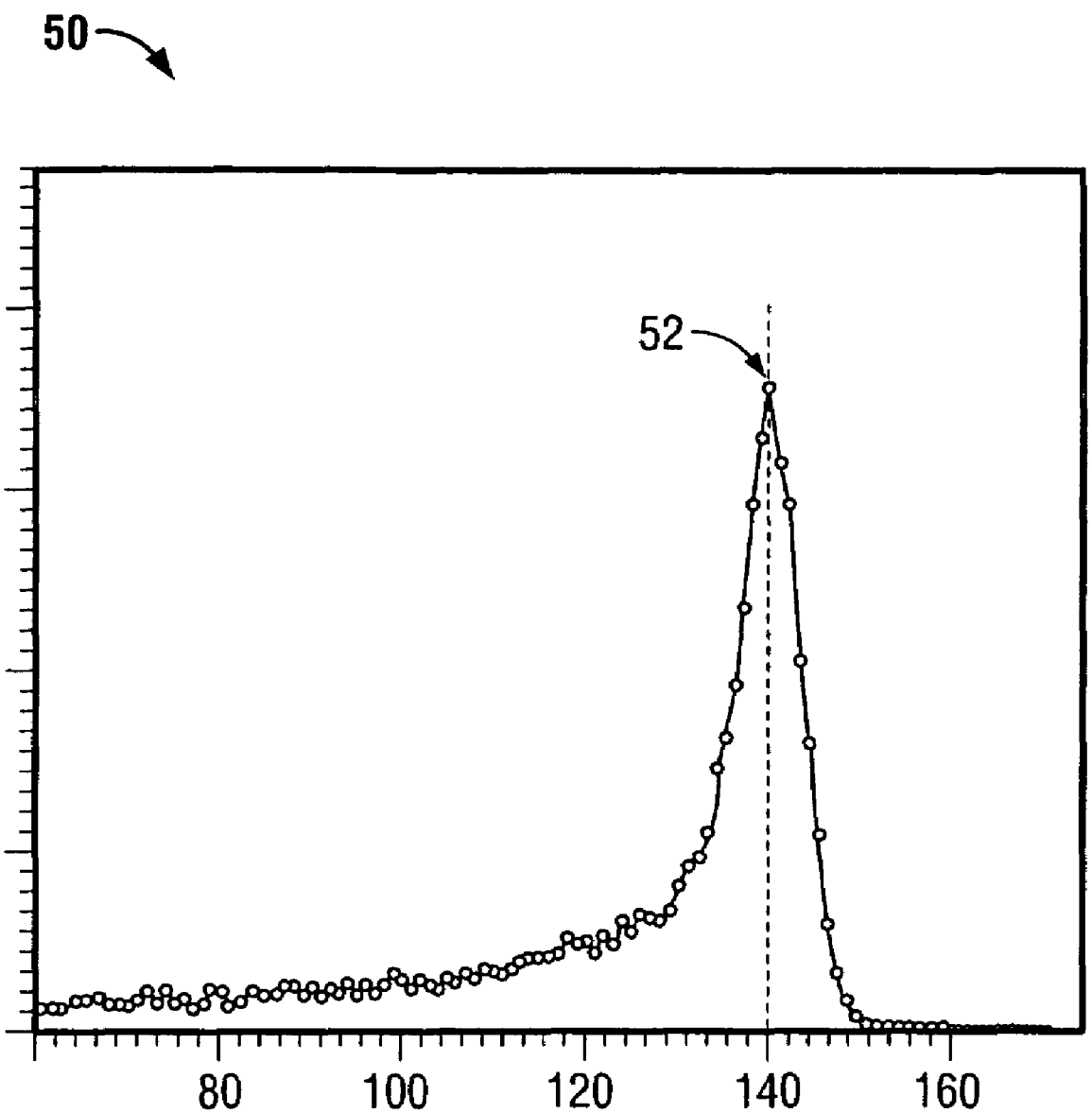
FIG. 1 is a graph that illustrates an exemplary energy spectrum of a single pixel of a pixilated CZT detector exposed to substantially unscattered 140 keV gamma rays.

FIG. 1 is a graph 50 that illustrates an exemplary energy spectrum of a single pixel of a pixilated CZT detector exposed to substantially unscattered 140 keV gamma rays. Graph 50 includes an x-axis graduated in units of keV and a y-axis representative of an amount of total counts or count rate observed at each keV level. An energy spectrum peak 52 centered about 140 keV represents the gamma rays that have been absorbed substantially within a central region portion of the single pixel. The distribution of signal amplitudes of these events is approximately Gaussian. However, a significant number of gamma rays are also detected in the portion of the energy response spectrum that tails toward the lower energies. This tail effect is caused, in part, by Compton scattering, by gamma ray absorption events that do not confine all charge creation to within a single pixel and by non-ideal charge collection. Because the illustrated response function represents the distribution of measured signals from only a single pixel, charge that is lost from the pixel and shared with adjacent pixels is not included in the response function. As a result, gamma ray absorption events in which the charge collection is incomplete due to charge sharing with other pixels are lost from the peak region and contribute to the low energy tailing.

Figure 2:
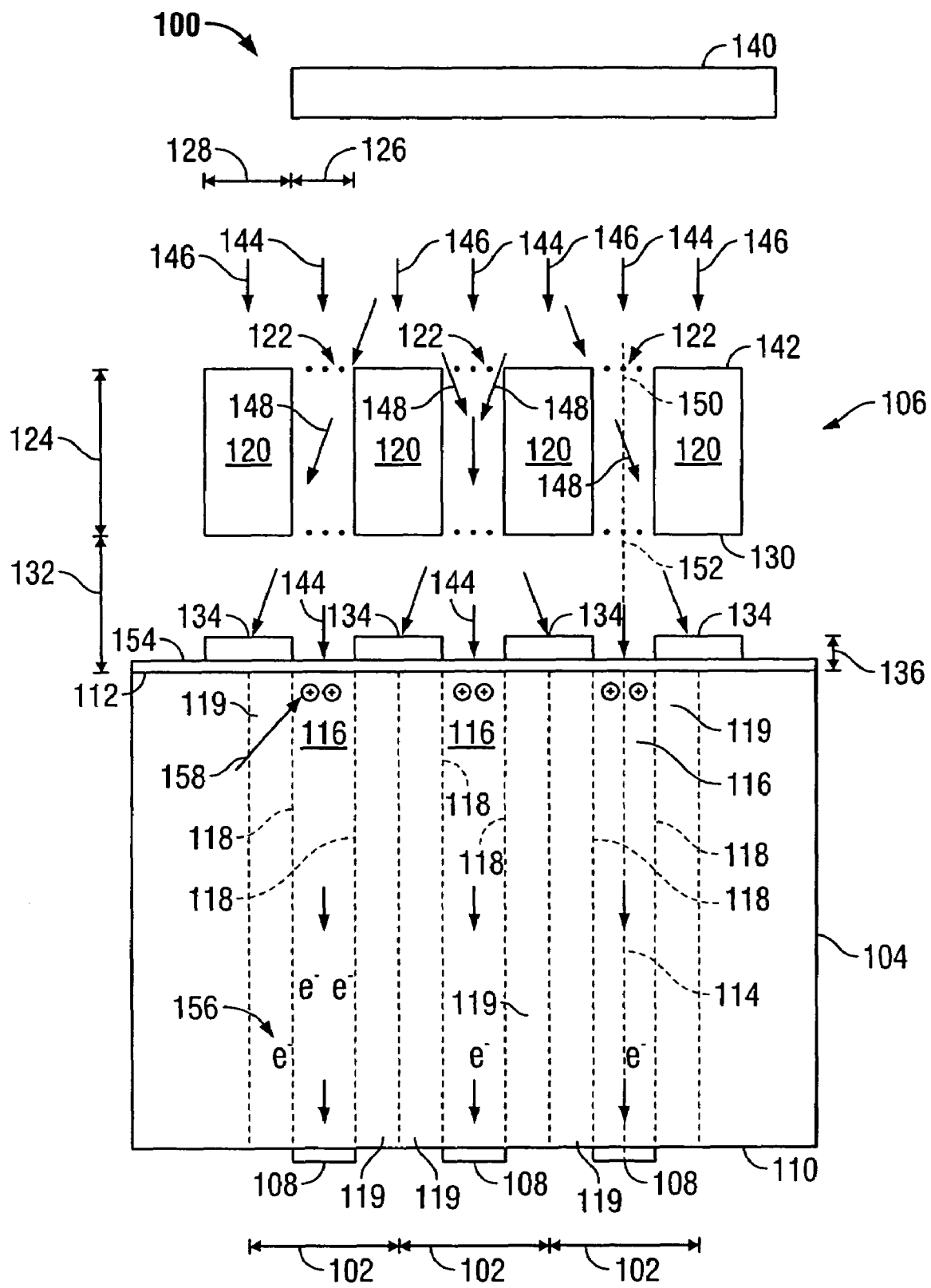
FIG. 2 is a cross-sectional elevation view of an exemplary imaging device detector having a plurality of pixilated semiconductor detector elements according to an embodiment of the present invention.

FIG. 2 is a cross-sectional elevation view of an exemplary imaging device detector 100 in accordance with one embodiment of the present invention and includes a plurality of pixilated semiconductor detector elements 102 that may be used in connection with, for example, localizing a radiation interaction event in the detector. In the exemplary embodiment, detector 100 includes a detector substrate 104 and a collimator 106. Detector 100 may be formed of a radiation responsive semiconductor material, for example, cadmium zinc telluride (CZT) crystals. Detector elements 102 may be formed of the substrate 104 by pixelating a corresponding plurality of pixel electrodes 108 coupled to a first surface 110 of detector substrate 104 (shown as a lower surface). A cross-sectional size and shape of pixel electrodes 108 and a spacing between each of the pixel electrodes 108 facilitates determining a location and size of each pixilated detector element 102. Specifically, each pixilated detector element 102 is located proximate a second surface 112 (shown as an upper surface) of detector substrate 104 in substantial alignment with a longitudinal axis 114 of a corresponding pixel electrode 108. Each pixilated detector element 102 includes a central region 116, bounded by useful limits 118, defining an operating portion, and a region of variable response 119. Within central region 116, pixilated detector element 102 has a substantially uniform and repeatable response characteristic to radiation incident on second surface 112. Detector substrate 104 in areas outside central region 116 has a response characteristic to radiation incident on second surface 112 that may be variable. An intrinsic spatial resolution of detector 100 may be defined by the size of and the spacing between each pixilated detector element 102. Because, pixilated detector elements 102 may be non-homogeneous in response and because central region 116 has a substantially uniform and repeatable response characteristic, collimator 106 may be formed to allow gamma and x-ray photons to interact with central region 116 and to block gamma and x-ray photons from reaching region of variable response 119.

Collimator 106 includes septa 120 that define apertures 122 through the collimator. A degree of collimation may be defined by a length 124 of collimator 106, a diameter 126 of apertures 122, a thickness 128 of apertures 122, and an absorption coefficient of the material collimator 106 from which collimator 106 is fabricated. A surface 130 of collimator 106 that is proximate second surface 112 defines a gap 132 between detector substrate 104 and collimator 106. A collimating mask 134 may abut and/or be coupled to second surface 112 and cover region of variable response 119. In one embodiment, collimating mask 134 is adhered to second surface 112. In another embodiment, collimating mask 134 is deposited on second surface 112 for example by using a vapor deposition process. A thickness 136 of collimating mask 134 may be determined based on an energy level of photons that may be incident on collimating mask 134 in operation, and an absorption coefficient of the material from which collimating mask 134 is fabricated. For example, collimating mask 134 may be fabricated from a relatively high atomic number material (e.g., an atomic number of about seventy-two or greater) that can absorb radiation of the type intended to be employed in imaging device detector 100, such as, for examples, lead and tungsten or alloys or conglomerates thereof.

In operation, photons, for example emission gammas and transmission x-rays, from a source 140 are directed towards second surface 112. A first portion 144 of the photons may arrive at an incident surface 142 of collimator 106 substantially parallel with septa 120 and in alignment with apertures 122, and pass through collimator 106 without substantial interaction with collimator 106. A second portion 146 of the photons may arrive at incident surface 142 of collimator 106 substantially parallel and in alignment with septa 120 and may interact with collimator 106 by absorption or scattering. A third portion 148 of the photons may arrive at incident surface 142 of collimator 106 at an angle 150 with respect to a longitudinal axis 152 of aperture 122. If angle 150 is greater than an angle determined by length 124 and diameter 126, a photon entering aperture 122 will interact with collimator 106 before exiting aperture 122. If angle 150 is less than the angle determined by length 124 and diameter 126, the photon may exit aperture 122 so as to interact with collimating mask 134 covering region of variable response 119. Accordingly, collimating mask 134 facilitates preventing photons, that would otherwise interact with region of variable response 119, from doing so.

Second surface 112 may be substantially covered by a single cathode electrode 154. First surface 110 has a rectangular array of small, for example between about one millimeters squared ($mm^2$) and about ten $mm^2$, generally square pixel electrodes 108 configured as anodes. A voltage difference applied between pixel electrodes 108 and cathode 154 during operation generates an electric field (detector field) in substrate 104. The detector field may be, for example, about one kilovolts per centimeter to three kilovolts per centimeter. Although pixel electrodes 108 are described in the exemplary embodiment as being generally square, this shape should not be understood to be limiting, in that other shapes of pixel electrodes 108 are contemplated.

When a photon is incident on substrate 104, it generally loses all its energy in substrate 104 by ionization and leaves pairs of mobile electrons 156 and holes 158 in a small localized region of substrate 104. As a result of the detector field, holes 158 drift toward cathode 154 and electrons 156 drift toward pixel electrodes 108, thereby inducing charges on pixel electrodes 108 and cathode 154. The induced charges on pixel electrodes 108 are detected and identify the time at which a photon was detected, how much energy the detected photon deposited in the substrate 104 and where in the substrate 104 the photon interaction occurred.

To facilitate optimum detection of gamma and x-ray photons, central region 116 should be in substantial alignment with apertures 122, collimating mask 134 should be in substantial alignment with septa 120, and the relative dimensions of gap 132, length 124, diameter 126 and thickness 128 should be determined such that photons arriving at incident surface 142 are absorbed in collimator 106, collimating mask 134, or central region 116.

Figure 3:
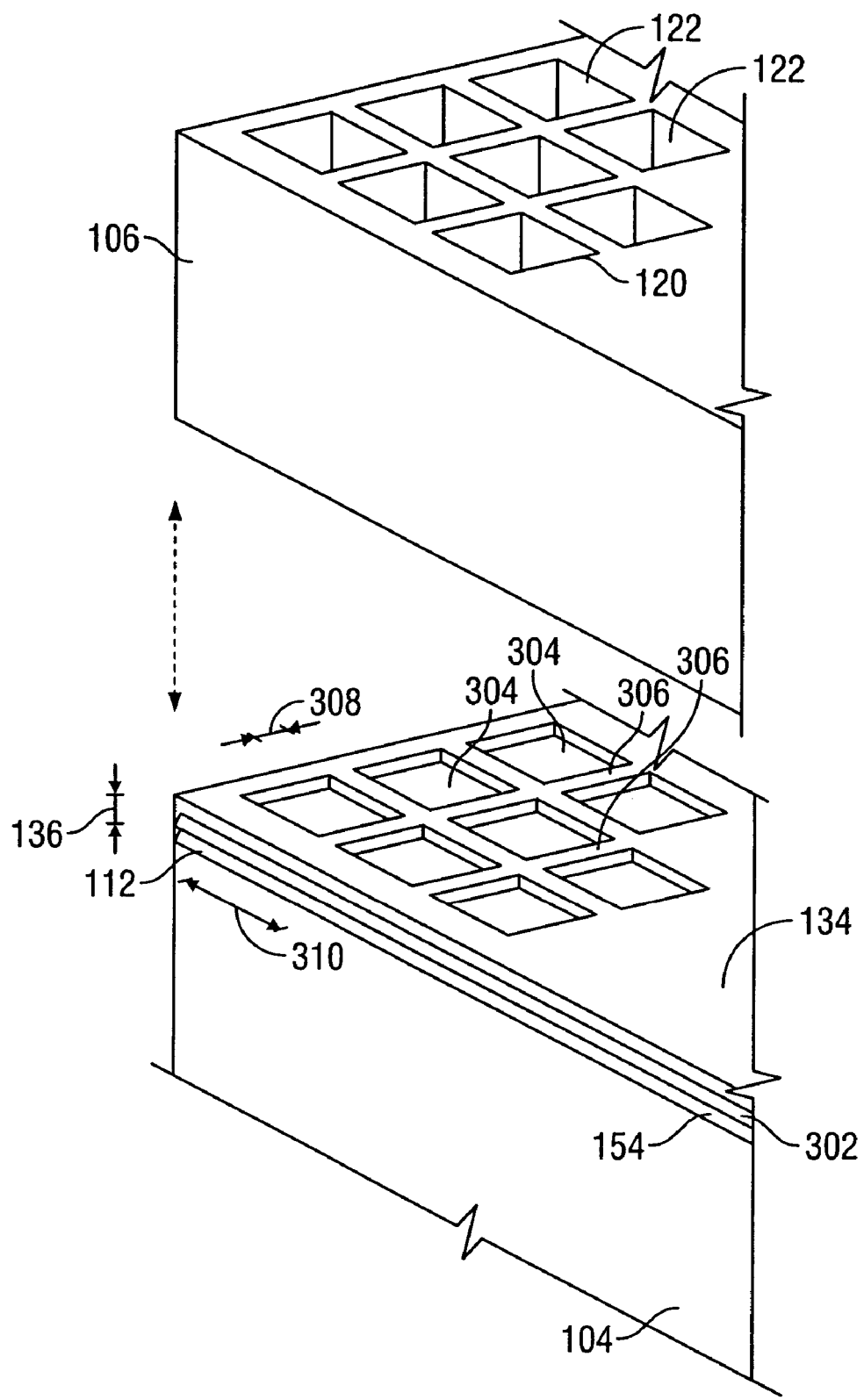
FIG. 3 is a perspective view of the imaging device detector shown in FIG. 2.

FIG. 3 is a perspective view of imaging device detector 100 (shown in FIG. 2). Imaging device detector 100 includes detector substrate 104 with high voltage cathode 154 covering substantially the entire second surface 112. A dielectric layer 302 is positioned over high voltage cathode 154 to insulate the high voltage applied to high voltage cathode 154 during operation from electrical and/or other components of imaging device detector 100. In the exemplary embodiment, dielectric layer 302 comprises Kapton™ film of about 0.01 mm to about 0.5 mm in thickness. In an alternative embodiment, other thin film dielectrics may be used, such as, but not limited to, Mylar™. Collimating mask 134 is applied to dielectric layer 302. Collimating mask 134 includes a plurality of mask openings 304 separated by mask septa 306. Mask openings 304 are shown, generally, as square openings, but may be fabricated as other shapes, such as hexagonal and round to meet specific requirements. Collimating mask thickness 136 may be selected to substantially reduce incident photons from interacting with region of variable response 119 and may be, for example, about one mm to six mm. If collimating mask 134 is fabricated from lead or tungsten, a typical collimating mask thickness 136 may be three mm to five mm. Thickness 136 may also be selected such that collimating mask 136 acts as a general purpose collimator, allowing imaging without using collimator 106 for certain scans, and allowing use with collimator 106 for relatively higher resolution scans. In various exemplary embodiments, a width 308 of mask septa 306 may be, for example, about 0.1 mm to about 0.5 mm.

In another embodiment, dielectric layer 302 may be removed, in which case, collimating mask 134 is held at a high voltage cathode voltage and insulated from surrounding low voltage components by, for example, an airgap, a dielectric coating, a dielectric layer, and/or dielectric components, such as paint, tape, and plastic parts.

Collimator 106 includes the plurality of apertures 122 separated by collimator septa 120. In the exemplary embodiment, a pitch 310 of mask openings 304 and septa 306 of collimating mask 134 is substantially equal to a pitch (not shown) of central region 116 and region of variable response 119 (both shown in FIG. 2). As used herein, pitch refers to a distance between identical features of a recurring pattern, for example, a distance between adjacent apertures 122 measured from a center of a first aperture 122 to a center of an adjacent aperture 122. In various exemplary embodiments, a pitch of apertures 122 and collimator septa 120 is about equal to the pitch of collimating mask 134. Due to a close coupling of collimating mask 134 to detector substrate 104, the pitch of collimator 106 may deviate from the pitch of collimating mask 134 without substantially affecting the performance of imaging device detector 100.

Figure 4:
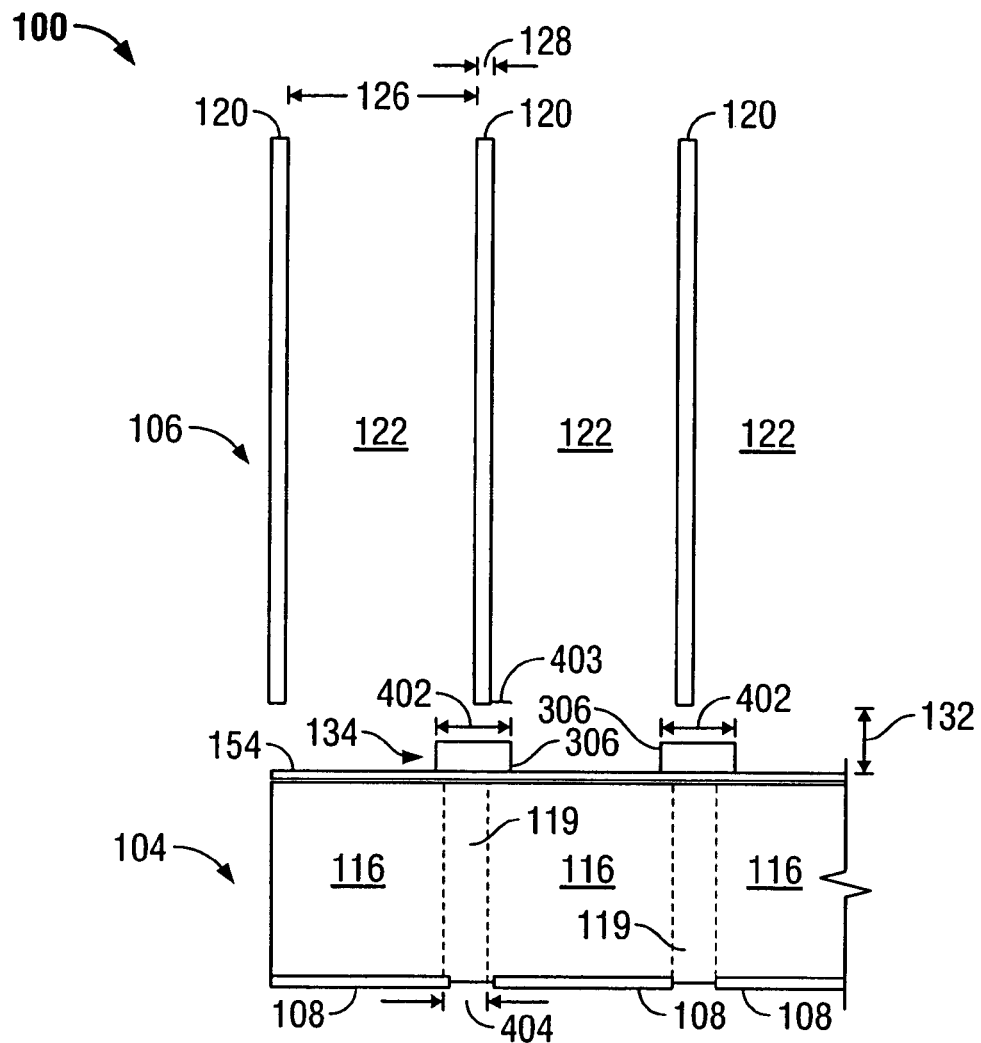
FIG. 4 is a schematic side elevation view of a portion of the imaging device detector shown in FIG. 2.

FIG. 4 is a schematic side elevation of a portion of imaging device detector 100 (shown in FIG. 2). FIG. 4 illustrates alignment tolerances between collimator 106 and collimating mask 134. Collimating mask septa 306 are fabricated such that they are positioned adjacent region of variable response 119 and may be fabricated to a width 402 that is wider than a width 404 of region of variable response 119 and collimating mask septa 306. Accordingly, this accommodates when collimator septa 306 may be offset a distance 403, due to lateral misalignment of collimator 106 with respect to detector substrate 104, a variation in collimator pitch from that of collimating mask 134, or other reason. The amount of offset, variation, or tolerance provided is determined by width 402, width 404, width 128, and gap 132. To improve the spatial resolution of imaging device detector 100, one or more additional stacking collimators (not shown) may be stacked on incident surface 142 of collimator 106 to effectively increase length 124. Accordingly, system 100 including collimating mask 134 may be supplied with a factory-determined sensitivity map. Using the various exemplary embodiments described herein, collimator 106 and other additional collimators may be added without substantially changing the sensitivity map.

Figure 5:
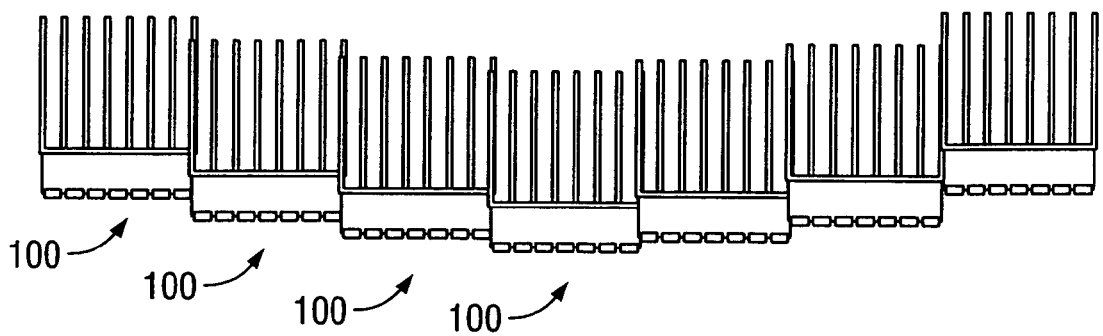
FIG. 5 is a schematic illustration of an exemplary array of imaging device detectors configured to couple to an arcuate base according to an embodiment of the present invention.

FIG. 5 is a schematic illustration of an exemplary array 500 of imaging device detectors 100 configured to couple to an arcuate base. Each imaging device detector 100 may be staggered or vertically incremented relative to each adjacent imaging device detector 100 to accommodate various mounting configuration requirements. Alternately, imaging device detectors 100 may be aligned with each adjacent imaging device detector 100 to accommodate mounting in a flat panel configuration.

The above-described imaging device detectors provide a cost-effective and reliable means for examining a patient. More specifically, the imaging system includes a collimating mask that is closely coupled to the surface of a planar pixilated semiconductor detector to facilitate reducing photon interaction in a region of variable response of the detector pixels. Coupling a collimating mask directly to the surface of the detector also facilitates improving the semiconductor (e.g., CZT) detector response energy spectrum, for example, reducing the characteristic tail, increasing detector imaging efficiency or the ability to tradeoff detector efficiency for higher spatial resolution, reducing response to scatter relative to direct photons (e.g., gammas and x-rays), reducing collimator handling, facilitating and simplifying collimator exchange, permitting "turn key" operation, and allowing for pre-calibration of the detector system at the factory before delivery to a customer.

Exemplary embodiments of pixilated photon detector methods and apparatus are described above in detail. The pixilated photon detector components illustrated are not limited to the specific embodiments described herein, but rather, components of each pixilated photon detector may be utilized independently and separately from other components described herein. For example, the pixilated photon detector components described above may also be used in combination with different imaging systems. A technical effect of the various embodiments of the systems and methods described herein include at least one of improving the semiconductor detector response energy spectrum by reducing the characteristic tail of the response and permitting simpler and easier exchange of collimators.

While the invention has been described in terms of various specific embodiments, those skilled in the art will recognize that the invention can be practiced with modification within the spirit and scope of the claims.

What is claimed is:

1. A method of detecting ionizing radiation utilizing a pixelated semiconductor substrate such that each pixel comprises a central region and a region of variable response, said method comprising:
   substantially blocking the ionizing radiation from reaching the region of variable response utilizing a collimating mask that deposited on at least one of a surface of the semiconductor substrate and of a thickness so that the collimating mask is suitable as a general purpose collimator, and a cathode electrode substantially covering the surface of the semiconductor substrate;
   collimating the ionizing radiation, wherein said collimating includes aligning a plurality of apertures of a first collimator with a corresponding opening in the collimating mask and the central region, with a gap between said first collimator and the collimating mask, and aligning a plurality of apertures of a stacking collimator with a corresponding aperture in said first collimator; and
   receiving the ionizing radiation at the central region, with the gap between said first collimator and the collimating mask.

2. A method of detecting ionizing radiation in accordance with claim 1 wherein said pixelated semiconductor substrate comprises a plurality of electrodes to a surface of said semiconductor substrate, a size and location of the plurality of electrodes defining a size and location of the pixels.

3. A method of detecting ionizing radiation in accordance with claim 1 wherein said substantially blocking the ionizing radiation from reaching the region of variable response comprises masking the semiconductor substrate such that septum of said collimating mask overlay the region of variable response.

4. A method of detecting ionizing radiation in accordance with claim 3 wherein said masking the semiconductor substrate comprises sizing a width of the septum to be greater then a width of the region of variable response.

5. A method of detecting ionizing radiation in accordance with claim 1 wherein said receiving the ionizing radiation at the central region comprises masking the semiconductor substrate such that said openings of said collimating mask overlay the central region and the central region remains exposed to the ionizing radiation.

6. A method of detecting ionizing radiation in accordance with claim 1 wherein said collimating the ionizing radiation comprises sizing a width of said first collimator septa to be less than a width of a collimating mask septa.

7. A method of detecting ionizing radiation in accordance with claim 1 further comprising fabricating a pitch of the collimating mask to be substantially equal to a pitch of the semiconductor pixels.

8. A method for aligning a collimator with a detector, said method comprising:
   depositing a collimating mask to cover a region of variable response to incident radiation of the detector, the collimating mask being deposited with a thickness to act as a general purpose collimator;
   configuring the collimating mask to expose a region of the detector with a substantially uniform response to the incident radiation;
   aligning each of a plurality of apertures of a first collimator with a corresponding opening in said collimating mask and the exposed region of the detector, with a gap between said first collimator and the collimating mask; and
   aligning each of a plurality of apertures of a stacking collimator with a corresponding aperture in said first collimator.

9. A method in accordance with claim 8 wherein the detector includes pixilated detector elements, said configuring is based on at least one of a size and shape of the pixilated detector elements.

10. A method in accordance with claim 8 further comprising configuring the collimating mask to couple to a detector substrate of the detector.

11. A method in accordance with claim 8 further comprising configuring the collimating mask in a grid arrangement.

12. A method in accordance with claim 11 wherein said configuring the collimating mask in a grid arrangement comprises:
   configuring the collimating mask with septa openings that expose a central, uniform response region of a pixel of the detector; and
   configuring the collimating mask with septa that overlay a region of variable response of the pixel that substantially surrounds the central region.

13. A method for controlling radiation exposure to a pixilated detector, said method comprising:
   substantially blocking radiation exposure to a region of variable response of the detector with a collimating mask that is deposited on at least one of a surface of a semiconductor substrate with sufficient thickness to act as a general purpose collimator, and a cathode electrode substantially covering the surface of the semiconductor substrate;
   exposing a substantially uniformly responsive region of the detector with a collimating mask;
   aligning a first collimator above a gap over the collimating mask; and
   aligning a plurality of apertures of a stacking collimator with a corresponding aperture in said first collimator.

14. An imaging system comprising:
   a semiconductor detector that includes:
      a pixilated semiconductor substrate that is responsive to ionizing radiation, said substrate including a first surface in a direction of a source of ionizing radiation; and
      a collimating mask of a thickness to act as a general purpose collimator deposited on said substrate first surface, said collimating mask including a plurality of mask openings exposing a central region of a pixel of said semiconductor detector substrate to the ionizing radiation, said collimating mask including mask septa substantially blocking the incident ionizing radiation from a region of variable response associated with the pixel; and a removable collimator aligned above a gap over the collimating mask; and
   each of a plurality of apertures of a stacking collimator aligned with a corresponding aperture in said removable collimator.

15. An imaging system in accordance with claim 14 wherein said pixilated semiconductor substrate is responsive to at least one of emission gamma photons and transmission x-ray photons.

16. An imaging system in accordance with claim 14 wherein said pixilated semiconductor substrate comprises cadmium zinc telluride (CZT).

17. An imaging system in accordance with claim 14 wherein said collimating mask comprises a material having an atomic number greater than seventy-two.

18. An imaging system in accordance with claim 14 wherein said collimating mask comprises at least one of lead, tungsten, alloys thereof, and conglomerates thereof.

19. An imaging system in accordance with claim 14 wherein said collimating mask comprises a thickness of between about one mm and about ten mm.

20. An imaging system in accordance with claim 19 wherein said collimating mask comprises a thickness of between about three mm and about seven mm.

21. An imaging system in accordance with claim 14 wherein said collimating mask comprises a pitch of between about one mm and about six mm.

22. An imaging system in accordance with claim 14 wherein said collimating mask comprises a pitch that is about equal to a pitch of said pixilated semiconductor substrate.

23. An imaging system in accordance with claim 14 wherein a width of said mask septa is greater than a width of said region of variable response.

24. An imaging system in accordance with claim 14 further comprising at least one electrode that defines each said pixel.

25. An imaging system in accordance with claim 24 wherein a size and position of each said pixel corresponds to a size and position of said at least one electrode.

26. An imaging system in accordance with claim 24 wherein each said at least one electrode comprises an anode.

27. An imaging system in accordance with claim 24 wherein said at least one electrode is coupled to a second surface of said semiconductor substrate.

28. An imaging system in accordance with claim 14 further comprising an electrode coupled to said semiconductor substrate, said electrode substantially covering said substrate first surface.

29. An imaging system in accordance with claim 28 further comprising a dielectric layer covering said electrode.

30. An imaging system in accordance with claim 14 wherein said mask is in contact with a cathode and said mask is substantially electrically insulated from other detector components.

31. An imaging system in accordance with claim 14 wherein said removable collimator is configured to receive a second collimator in the direction of the radiation source.

32. An imaging system in accordance with claim 14 wherein said stacking collimator comprises said plurality of apertures separated by septa, each of said plurality of apertures positioned in substantial alignment with one of said plurality of mask openings when said stacking collimator is installed in an assembled position.

33. A detector assembly for an imaging system, said detector assembly comprising:
   a radiation detector comprising:
      a pixilated semiconductor substrate comprising a pixel electrode coupled to a first surface of said substrate, said pixel electrode defining a pixel region of said substrate;
      a cathode covering a second surface of said substrate;
      a dielectric layer covering said cathode;
      a collimating mask of a thickness to act as a general purpose collimator deposited on said dielectric layer and comprising a mask portion comprising openings therethrough surrounded by a mask septa, said mask portion configured to expose a central region of the pixel, and to overlay a region surrounding the central region; and
   a first collimator removably couplable to said radiation detector above a gap, said first collimator comprising apertures therethrough, said apertures configured to substantially align with the collimating mask openings, said first collimator further configured to receive a stackable collimator such that apertures of the first collimator and the stackable collimator substantially align with respect to each other; and a stackable collimator configured to be received on the first collimator.

34. A detector assembly in accordance with claim 33 wherein said substrate comprises Cadmium Zinc Telluride (CZT).

35. A detector assembly in accordance with claim 33 wherein said collimating mask comprises a material having an atomic number greater than seventy-two.

36. A detector assembly in accordance with claim 33 further comprising a plurality of adjacent radiation detectors arranged linearly in a one detector by N detector configuration.

37. A detector assembly in accordance with claim 36 wherein said plurality of detectors are oriented in parallel alignment and arranged along an arcuate path.

38. A detector assembly in accordance with claim 33 further comprising a plurality of adjacent radiation detectors arranged planarly in a M detector by N detector configuration.

39. A detector assembly in accordance with claim 38 wherein said plurality of detectors are oriented in parallel alignment and arranged along a concave path.

40. A detector assembly in accordance with claim 33 wherein said mask is in electrical contact with the Cathode and insulated from other components.

* * * * *